(12) United States Patent
Tsaur et al.

(10) Patent No.: US 9,020,896 B1
(45) Date of Patent: Apr. 28, 2015

(54) SYSTEMS AND METHODS FOR SIMPLIFYING DATA RESTORATION USING RESOURCE TYPES

(71) Applicants: Ynn-Pyng Tsaur, Oviedo, FL (US); Baishen Zhu, Sanford, FL (US); Lijo Abraham, Lake Mary, FL (US); Gregory Robert Dowers, II, Lake Mary, FL (US); Kirk Freiheit, Lake Mary, FL (US)

(72) Inventors: Ynn-Pyng Tsaur, Oviedo, FL (US); Baishen Zhu, Sanford, FL (US); Lijo Abraham, Lake Mary, FL (US); Gregory Robert Dowers, II, Lake Mary, FL (US); Kirk Freiheit, Lake Mary, FL (US)

(73) Assignee: Symantec Corporation, Mountain View, CA (US)

( * ) Notice: Subject to any disclaimer, the term of this patent is extended or adjusted under 35 U.S.C. 154(b) by 190 days.

(21) Appl. No.: 13/650,054

(22) Filed: Oct. 11, 2012

(51) Int. Cl.
*G06F 17/00* (2006.01)
*G06F 11/14* (2006.01)

(52) U.S. Cl.
CPC ........ *G06F 11/1458* (2013.01); *G06F 11/1469* (2013.01)

(58) Field of Classification Search
CPC ............ G06F 11/1469; G06F 11/1438; G06F 17/30067; G06F 2201/84; G06F 11/1451; G06F 11/1458

USPC ............ 707/600–831, 899, 999.001–999.206
See application file for complete search history.

(56) References Cited

U.S. PATENT DOCUMENTS

| 7,222,133 B1* | 5/2007 | Raipurkar et al. ............ 707/642 |
| 7,676,689 B1* | 3/2010 | Shioyama et al. ........... 714/6.12 |
| 2011/0231169 A1* | 9/2011 | Furem et al. ..................... 703/2 |
| 2012/0036108 A1* | 2/2012 | Prahlad et al. ................ 707/661 |

OTHER PUBLICATIONS

Vladan Seget; Restore Individual e-mails with Acronis Recovery for Exchange, http://www.youtube.com/watch?v=0XqHJWo-lh4, as accessed on Jul. 3, 2012.

\* cited by examiner

*Primary Examiner* — Angelica Ruiz
(74) *Attorney, Agent, or Firm* — ALG Intellectual Property, LLC

(57) ABSTRACT

A computer-implemented method for simplifying data restoration using resource types. The method may include (1) receiving a request from a user to perform a data restoration operation, (2) providing a graphical user interface that presents to the user a plurality of resource types that can be restored by the user, (3) receiving, from the user via the graphical user interface, a selection that identifies a resource type that the user desires to restore, (4) presenting, to the user via the graphical user interface, at least one backup set associated with the identified resource type from which the user may restore data, (5) receiving, from the user via the graphical user interface, a selection that identifies a backup set that the user desires to restore, and (6) restoring data from the identified backup set. Various other methods, systems, and computer-readable media are also disclosed.

20 Claims, 14 Drawing Sheets

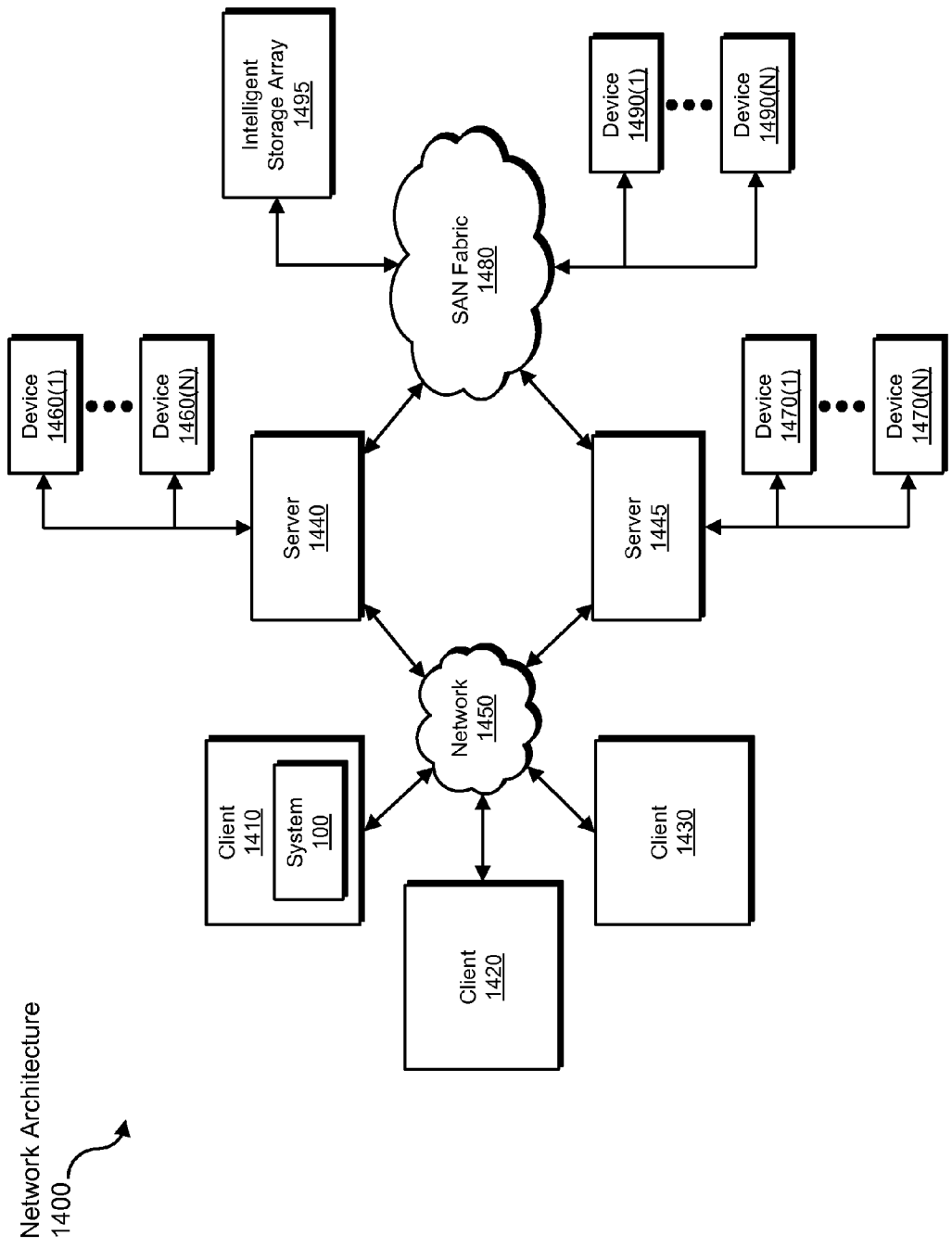

SYSTEMS AND METHODS FOR SIMPLIFYING DATA RESTORATION USING RESOURCE TYPES

BACKGROUND

In the digital age, organizations increasingly rely on digitally stored data. To protect against data loss, an organization may use one or more backup systems and/or data-restoration systems to back up and later restore important data. Due to increasingly complex information technology infrastructures, an organization may create backups for a variety of resources (e.g., file systems, email applications, content management applications, and databases), using a variety of methods (e.g., full, incremental, or differential), and according to a variety of different schedules. Accordingly, an administrator may face a proliferation of backup sets from which data may be restored.

A traditional data-restoration solution may leave to the administrator the responsibility of correctly locating a backup set containing data that the administrator desires to restore from among the backup sets managed by the data-restoration solution. Complicating matters, some traditional data-restoration solutions may display to the administrator backup sets from multiple different resources in a single mixed view. For these reasons, the process of using traditional data-restoration solutions to restore data from a large number of backup sets may be complicated, time-consuming, and prone to user error. Accordingly, the instant disclosure identifies and addresses a need for additional and improved systems and methods for simplifying data restoration.

SUMMARY

As will be described in greater detail below, the instant disclosure generally relates to systems and methods for simplifying data restoration using resource types. In one example, a computer-implemented method for simplifying data restoration using resource types may include (1) receiving a request from a user to perform a data restoration operation, (2) providing, in response to the request to perform the data restoration operation, a graphical user interface that presents to the user a plurality of resource types that can be restored by the user, (3) receiving, from the user via the graphical user interface, a selection that identifies a resource type that the user desires to restore, (4) presenting, to the user via the graphical user interface, at least one backup set associated with the identified resource type from which the user may restore data, (5) receiving, from the user via the graphical user interface, a selection that identifies a backup set that the user desires to restore, and (6) restoring data from the identified backup set.

In some embodiments, the step of providing the graphical user interface may include (1) identifying at least one backup set managed by a data-restoration system and then (2) presenting, to the user via the graphical user interface, only resource types associated with the backup set managed by the data-restoration system.

In other embodiments, the step of presenting the backup set associated with the identified resource type may include (1) presenting, to the user via the graphical user interface, a plurality of resource sub-types that are associated with the identified resource type that can be restored by the user, (2) receiving, from the user via the graphical user interface, a selection that identifies a resource sub-type that the user desires to restore, and (3) presenting, to the user via the graphical user interface, at least one backup set associated with the identified resource sub-type from which the user may restore data.

In at least one embodiment, the step of presenting the plurality of resource sub-types may include identifying at least one backup set managed by a data-restoration system and then presenting, to the user via the graphical user interface, only resource sub-types associated with the backup set managed by the data-restoration system.

In certain embodiments, the request from the user to perform the data restoration operation may include a request to restore data to a server, and the plurality of resource types may include a resource type of a resource on the server.

In at least one embodiment, the step of presenting the backup set associated with the identified resource type may include presenting the backup set as being associated with a server from which the backup set was created and/or a resource from which the backup set was created.

In various embodiments, the user may be prompted to select the identified resource type and the identified backup set via the graphical user interface using a series of questions presented to the user via the graphical user interface.

In one embodiment, a system for implementing the above-described method may include (1) a restoration module programmed to receive a request from a user to perform a data restoration operation, (2) an interface module programmed to provide, in response to the request to perform the data restoration operation, a graphical user interface that presents to the user a plurality of resource types that can be restored by the user, (3) a type-selection module programmed to receive, from the user via the graphical user interface, a selection that identifies a resource type that the user desires to restore, (4) a backup-set-presentation module programmed to present, to the user via the graphical user interface, at least one backup set associated with the identified resource type from which the user may restore data, (5) a backup-set-selection module programmed to receive, from the user via the graphical user interface, a selection that identifies a backup set that the user desires to restore, (6) a data-restoring module programmed to restore data from the identified backup set, and (7) at least one processor configured to execute the restoration module, the interface module, the type-selection module, the backup-set-presentation module, the backup-set-selection module, and the data-restoring module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) receive a request from a user to perform a data restoration operation, (2) provide, in response to the request to perform the data restoration operation, a graphical user interface that presents to the user a plurality of resource types that can be restored by the user, (3) receive, from the user via the graphical user interface, a selection that identifies a resource type that the user desires to restore, (4) present, to the user via the graphical user interface, at least one backup set associated with the identified resource type from which the user may restore data, (5) receive, from the user via the graphical user interface, a selection that identifies a backup set that the user desires to restore, and (6) restore data from the identified backup set.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 14 is a block diagram of an exemplary computing network capable of implementing one or more of the embodiments described and/or illustrated herein.

Figure 1:
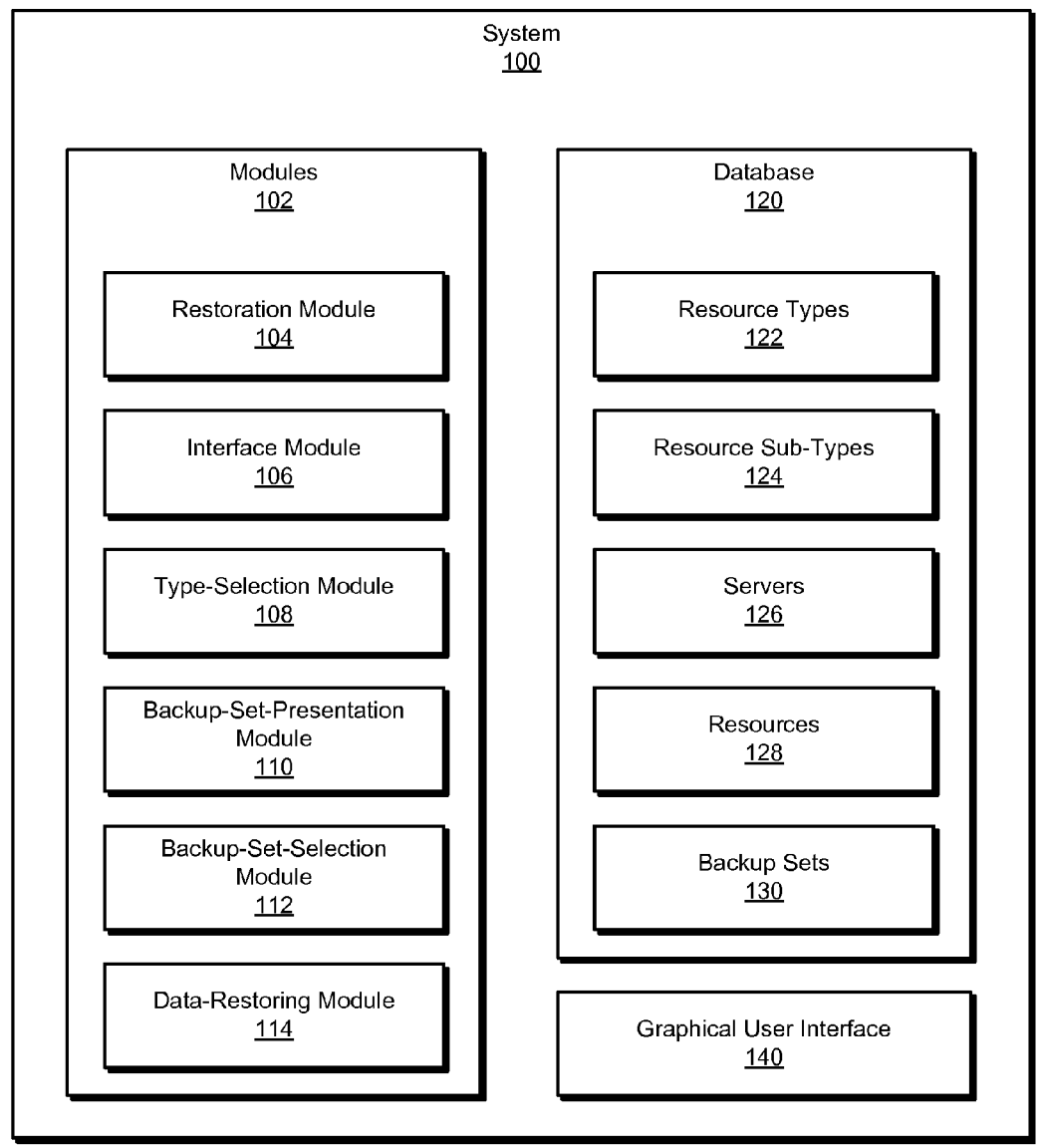
FIG. 1 is a block diagram of an exemplary system for simplifying data restoration using resource types.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for simplifying data restoration using resource types. As will be explained in greater detail below, by using resource types and/or resource sub-types to guide a user to select data that the user desires to restore, the systems and methods described herein may provide the user with a clear and simple procedure to restore data. Furthermore, in some examples, by presenting to the user only resource types and/or resource sub-types associated with data that has been backed up and that is available to be restored, these systems and methods may reduce the amount of information with which the user must interact while restoring data thus eliminating user confusion caused when the user is required to interact with too much information.

Figure 2:
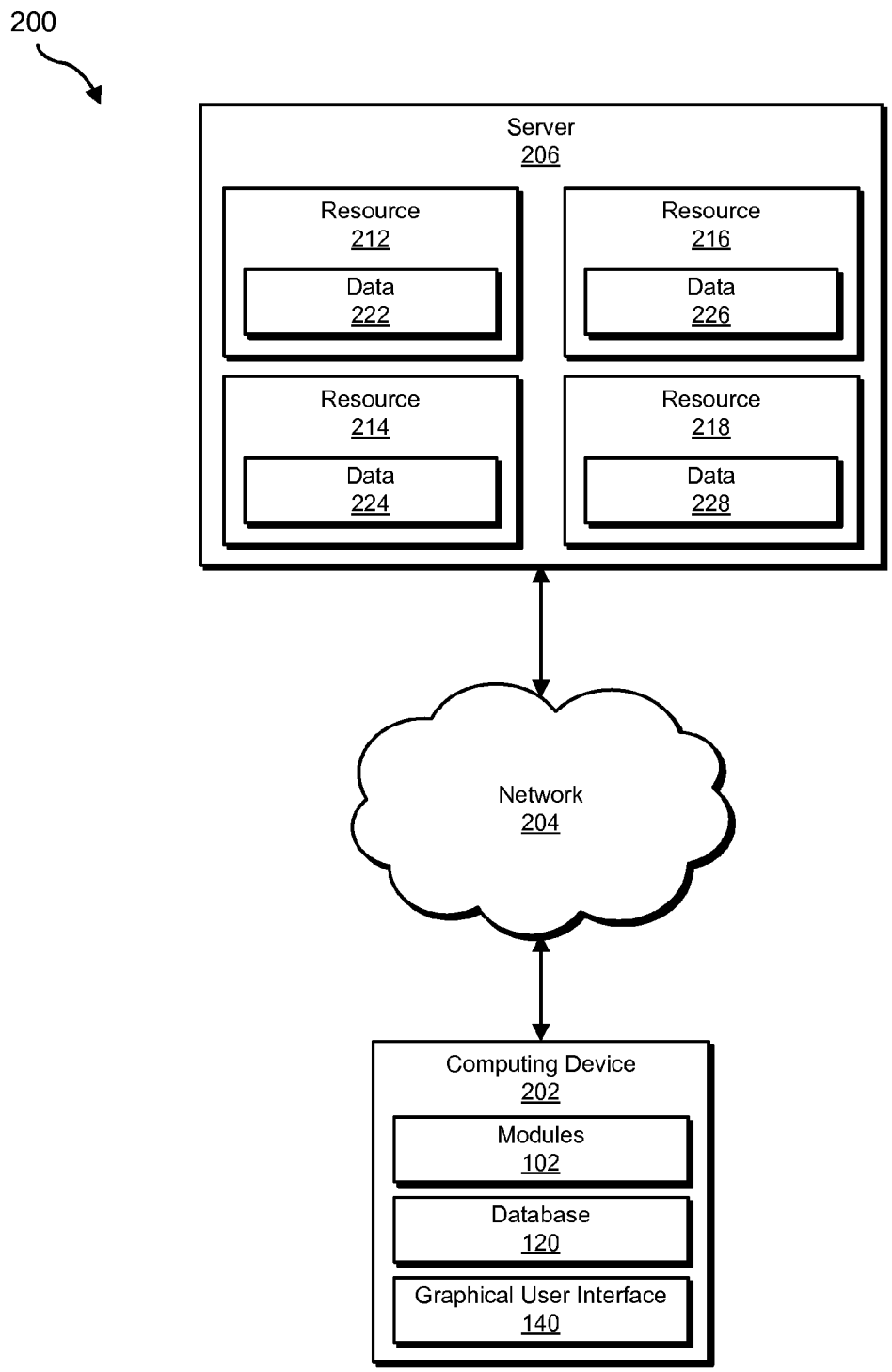
FIG. 2 is a block diagram of an exemplary system for simplifying data restoration using resource types.

The following will provide, with reference to FIGS. 1-2, detailed descriptions of exemplary systems for simplifying data restoration using resource types. Detailed descriptions of corresponding computer-implemented methods will also be provided in connection with FIG. 3. In addition, detailed descriptions of exemplary graphical user interfaces will be provided in connection with FIGS. 4-12. Furthermore, detailed descriptions of an exemplary computing system and network architecture capable of implementing one or more of the embodiments described herein will be provided in connection with FIGS. 13 and 14, respectively.

FIG. 1 is a block diagram of an exemplary system 100 for simplifying data restoration using resource types. As illustrated in this figure, exemplary system 100 may include one or more modules 102 for performing one or more tasks. For example, and as will be explained in greater detail below, exemplary system 100 may include a restoration module 104 programmed to receive a request from a user to perform a data restoration operation. Exemplary system 100 may also include an interface module 106 programmed to provide a graphical user interface that presents to the user a plurality of resource types that can be restored by the user.

In addition, and as will be described in greater detail below, exemplary system 100 may include a type-selection module 108 programmed to receive, from the user via the graphical user interface, a selection that identifies a resource type that the user desires to restore. Exemplary system 100 may also include a backup-set-presentation module 110 programmed to present, to the user via the graphical user interface, at least one backup set associated with the identified resource type from which the user may restore data.

Furthermore, exemplary system 100 may include a backup-set-selection module 112 programmed to receive, from the user via the graphical user interface, a selection that identifies a backup set that the user desires to restore, and a data-restoring module 114 programmed to restore data from the identified backup set. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, one or more of modules 102 in FIG. 1 may represent a portion of a data-restoration application. In one example, and as will be described in greater detail below, one or more of modules 102 may represent software modules stored and configured to run on one or more computing devices, such as the devices illustrated in FIG. 2 (e.g., computing device 202 and/or server 206), computing system 1310 in FIG. 13, and/or portions of exemplary network architecture 1400 in FIG. 14. One or more of modules 102 in FIG. 1 may also represent all or portions of one or more special-purpose computers configured to perform one or more tasks.

As illustrated in FIG. 1, exemplary system 100 may also include one or more databases, such as database 120. As will be described in greater detail below, database 120 may include resource types 122 for storing information about resource types, resource sub-types 124 for storing information about resource sub-types, servers 126 for storing information about servers, resources 128 for storing information about resources, and backup sets 130 for storing information about backup sets.

In one example, a backup system may backup data from one or more servers and/or one or more resources. In this example, servers 126 may include information about the servers backed up by the backup system, resources 128 may include information about resources backed up by the backup system, and backup sets 130 may include information (e.g., backed up data) about the sets of data backed up by the backup system. Additionally, resource types 122 may include information associating resource types with the servers in servers 126, the resources in resources 128, the backup sets in backup sets 130, and/or the resource sub-types in resource sub-types 124. Similarly, resource sub-types 124 may include information associating resource sub-types with the servers in servers 126, the resources in resources 128, and/or the backup sets in backup sets 130.

Database 120 may represent portions of a single database or computing device or a plurality of databases or computing devices. For example, database 120 may represent a portion of computing device 202 and/or server 206 in FIG. 2, computing system 1310 in FIG. 13, and/or portions of exemplary network architecture 1400 in FIG. 14. Alternatively, database 120 in FIG. 1 may represent one or more physically separate devices capable of being accessed by a computing device, such as server 206 in FIG. 2, computing system 1310 in FIG. 13, and/or portions of exemplary network architecture 1400 in FIG. 14.

As illustrated in FIG. 1, exemplary system 100 may include at least one graphical user interface. For example, exemplary system 100 may include graphical user interface 140 (examples of which are illustrated in FIGS. 4-12) for presenting information to and receiving information from a user.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. Computing device 202 may be programmed with one or more of modules 102, may store all or a portion of the data in database 120, and/or may be configured to present graphical user interface 140 to a user of computing device 202. Although not illustrated in FIG. 2, server 206 may be programmed with one or more of modules 102 and/or may store all or a portion of the data in database 120.

As will be explained in greater detail below, server 206 may include one or more resources. For example, as illustrated in FIG. 2, server 206 may include resource 212 with associated data 222, resource 214 with associated data 224, resource 216 with associated data 226, and resource 218 with associated data 228. As used herein, the term "resource" may include any collection of data that may be the target of a backup operation. Examples of resources may include, without limitation, files, folders, file systems, storage devices, databases, websites, applications, services, computing devices, and/or portions of the same.

In one embodiment, one or more of modules 102 from FIG. 1 may, when executed by at least one processor of computing device 202 and/or server 206, facilitate computing device 202 and/or server 206 in simplifying data restoration using resource types. For example, and as will be described in greater detail below, one or more of modules 102 may cause computing device 202 and/or server 206 to (1) receive a request from a user to perform a data restoration operation (e.g., a request to restore data 222 to a specific point in time from a backup set contained within backup sets 130), (2) provide, in response to the request to perform the data restoration operation, a graphical user interface (e.g., graphical user interface 140) that presents to the user a plurality of resource types (e.g., one or more of resource types 122) that can be restored by the user, (3) receive, from the user via the graphical user interface, a selection that identifies a resource type that the user desires to restore, (4) present, to the user via the graphical user interface, at least one backup set (e.g., one or more of backup sets 130) associated with the identified resource type from which the user may restore data, (5) receive, from the user via the graphical user interface, a selection that identifies a backup set that the user desires to restore, and (6) restore data from the identified backup set.

Computing device 202 generally represents any type or form of computing device capable of reading computer-executable instructions and presenting a graphical user interface to a user. Examples of computing device 202 include, without limitation, laptops, tablets, desktops, servers, cellular phones, Personal Digital Assistants (PDAs), multimedia players, embedded systems, combinations of one or more of the same, exemplary computing system 1310 in FIG. 13, or any other suitable computing device.

Server 206 generally represents any type or form of computing device that is capable of reading computer-executable instructions. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 1400 in FIG. 14, or the like. Network 204 may facilitate communication or data transfer using wireless or wired connections. In one embodiment, network 204 may facilitate communication between computing device 202 and server 206.

Figure 3:
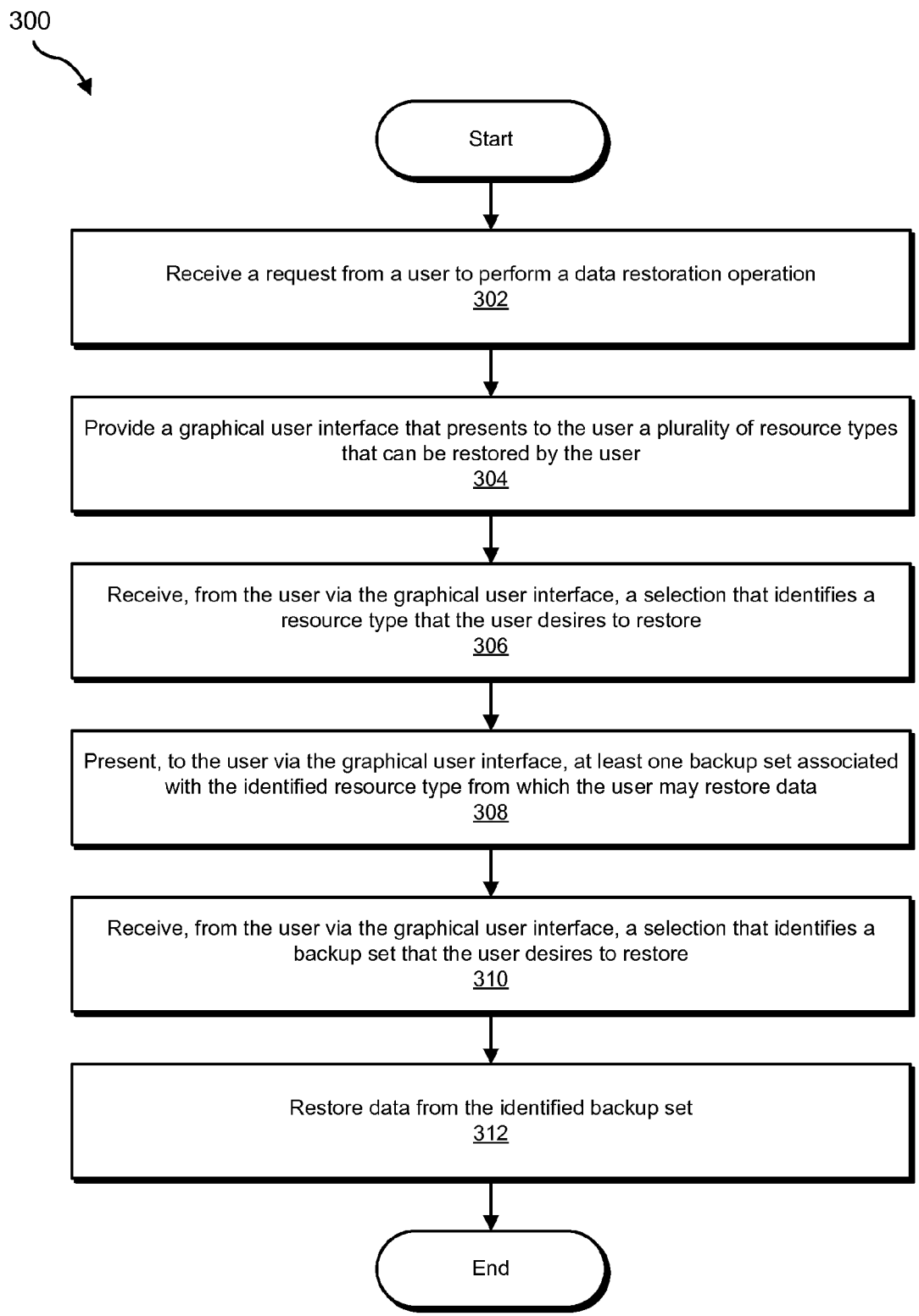
FIG. 3 is a flow diagram of an exemplary method for simplifying data restoration using resource types.

FIG. 3 is a flow diagram of an exemplary computer-implemented method 300 for simplifying data restoration using resource types. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 1310 in FIG. 13, and/or portions of exemplary network architecture 1400 in FIG. 14.

At step 302, one or more of the systems described herein may receive a request from a user to perform a data restoration operation. For example, at step 302 restoration module 104 may, as part of computing device 202 in FIG. 2, receive a request from a user of computing device 202 to restore data to server 206.

The systems described herein may perform step 302 in any suitable manner. For example, as mentioned above, one or more of modules 102 may represent a data-restoration application with which a user may interact using an associated graphical user interface (e.g., graphical user interface 140) to restore data managed by a data-restoration system. In such an example, restoration module 104 may receive a request from a user to perform a data restoration operation by detecting that the user has begun interacting with the data-restoration application (e.g., by launching the application or its associated graphical user interface).

In another example, restoration module 104 may receive a request from a user to perform a data restoration operation by receiving a request from the user that indicates that the user desires to restore data to or from a specific server or resource. In one such example, restoration module 104 may present, to the user via graphical user interface 140, a list of servers (e.g., one or more of servers 126) whose backups are managed by a data-restoration system from which the user may select a server whose data the user desires to restore. Restoration module 104 may then receive a selection from the user via graphical user interface 140 that identifies the server whose data the user desires to restore.

As used herein, the term "data restoration operation" may generally refer to any operation that restores data from a backup set to a location (e.g., a server or resource) from which the data was backed up or to any other alternative location. For example, a data restoration operation may include restoring data 222 in FIG. 2 (e.g., a file, an email, a document, etc.) to resource 212 (e.g., a storage device, an email service, a content management service, etc.) and/or server 206 from a backup of data 222 stored in backup sets 130.

At step 304, one or more of the systems described herein may provide, in response to the request to perform the data restoration operation, a graphical user interface that presents to the user a plurality of resource types that can be restored by the user. For example, at step 304 interface module 106 may, as part of computing device 202 in FIG. 2, provide, in response to the request from the user of computing device 202 to restore data to server 206, graphical user interface 140 that presents to the user one or more resource types from resource types 122 associated with data that can be restored to server 206.

As used herein, the term "resource type" may refer to any type, characteristic, class, category, or collection of resources that may be used to enable a user to identify data that has been backed up from an associated resource and/or any term or phrase used to describe these types, characteristics, classes, categories, or collections.

Figure 4:
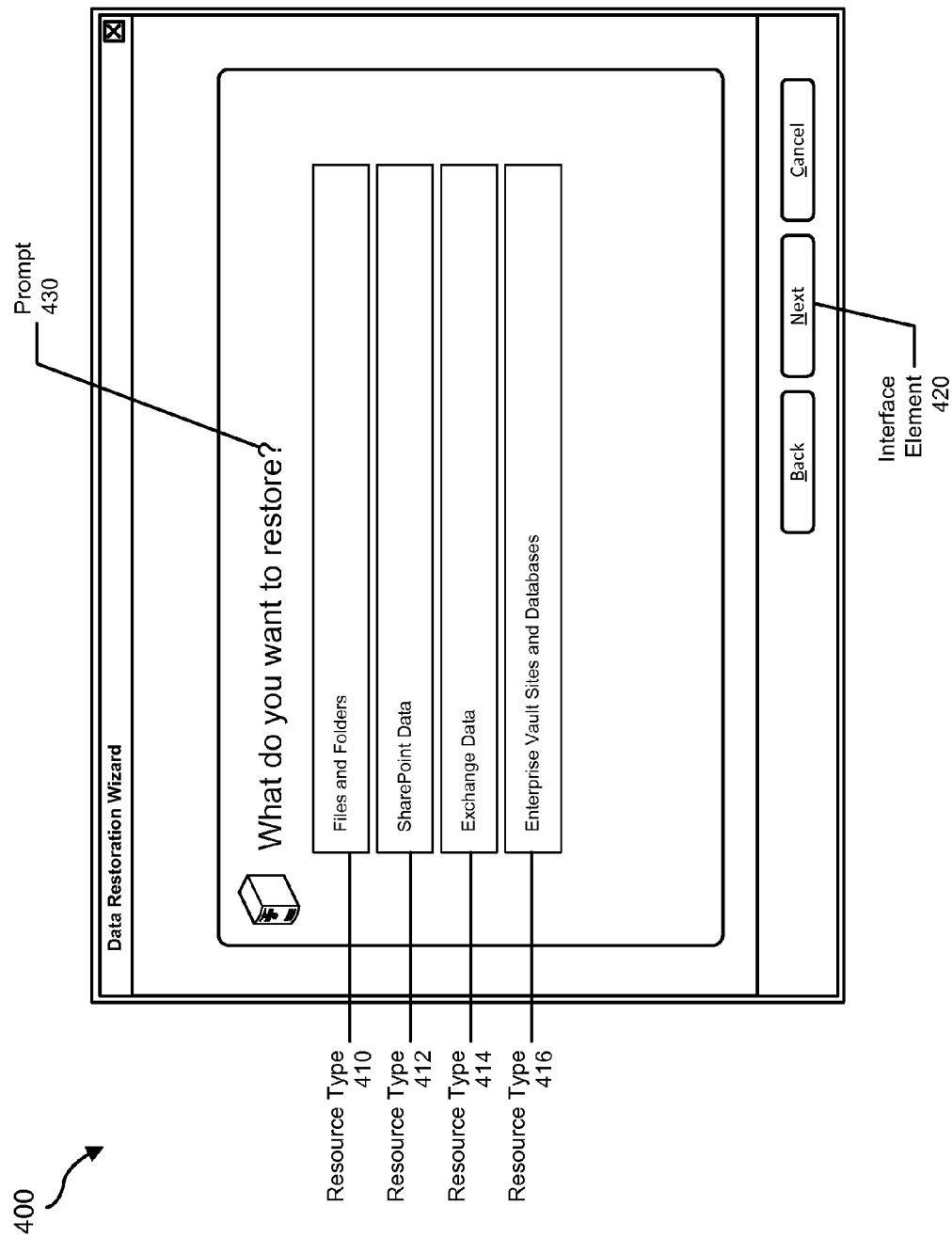
FIG. 4 is a diagram of an exemplary graphical user interface for simplifying data restoration using resource types.
Figure 6:
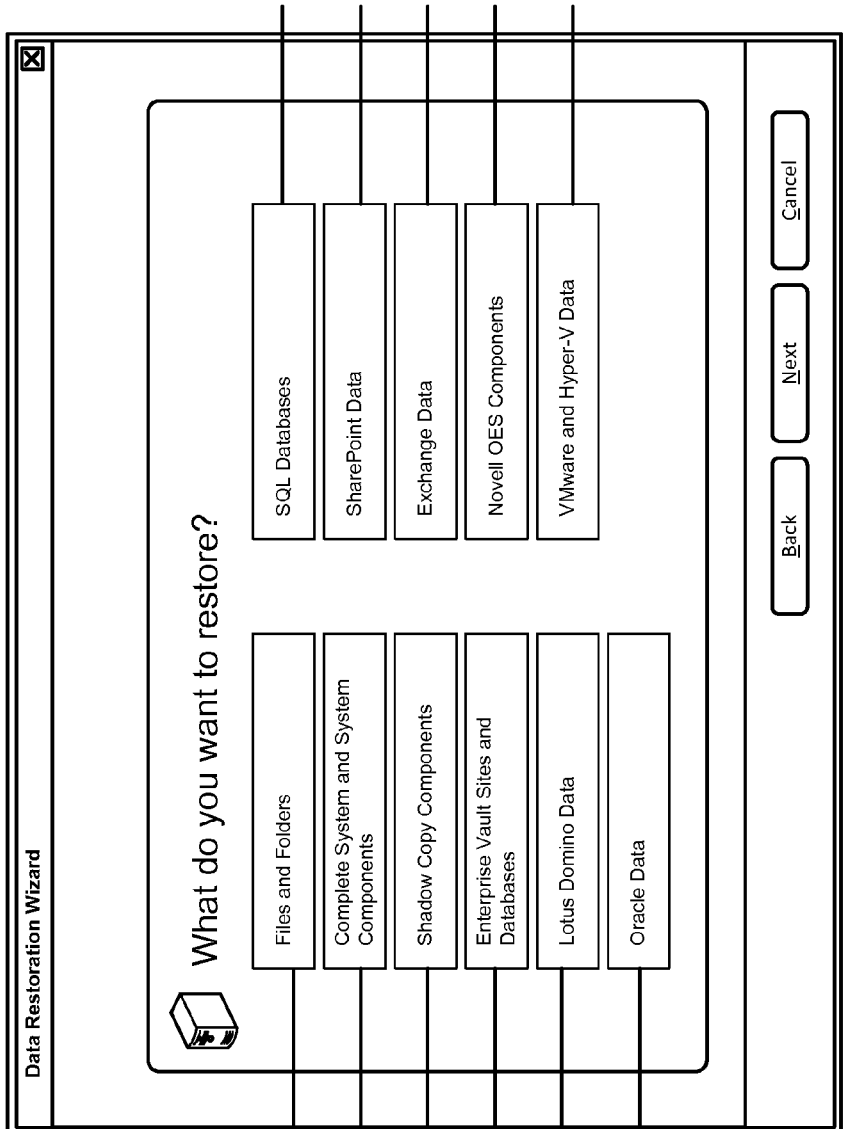
FIG. 6 is a diagram of an exemplary graphical user interface for simplifying data restoration using resource types.

In one example, a resource type may represent a user's likely answer to the question "What do you want to restore?" For example, as illustrated by resource types 410-416 in FIG. 4 and resource types 610-630 in FIG. 6 resource types may include "Files and Folders", "Complete System and System Components", "Shadow Copy Components", "Enterprise Vault Sites and Databases", "Lotus Domino Data", "Oracle Data", "SQL Databases", "SharePoint Data", "Exchange Data", "Novell OES Components", and "VMware and Hyper-V Data".

Other examples of resource types may include, without limitation, resource types based on generic categories of resources (e.g., file data, folder data, email data, database data, etc.), resource types based on resource product names (e.g., "Shadow Copy Data", "Enterprise Vault Data", "Lotus Domino Data", or "Hyper-V Data"), and resource types based on product or service provider names associated with resources (e.g., "Oracle Data", "VMware Data", or "Novell Data").

Additional examples of resource types may include, without limitation, resource types based on methods of locating data backed up from associated resources (e.g., "located through search"), resource types based on points in time to which data backed up from associated resources may be restored, resource types that indicate destinations to which data backed up from associated resources may be restored, resource types that indicate sources (e.g., a server) from which data from associated resources has been backed up, resource types that indicate times at or by which data from associated resources may be restored, and resource types that indicate restoration options available when restoring data from associated resources.

The systems described herein may perform step 304 in any suitable manner. For example, as illustrated by exemplary graphical user interfaces 400, 500, and 600 in FIGS. 4-6, interface module 106 may present to the user via graphical user interface 140 a graphical representation of one or more resource types.

In one example, interface module 106 may present to the user via graphical user interface 140 a predetermined set of resource types. For example, interface module 106 may present to the user each resource type that a data-restoration system is capable of restoring. In one example, interface module 106 may provide graphical user interface 140 as illustrated by exemplary graphical user interface 600 in FIG. 6 that presents each resource type that a data-restoration system is capable of restoring (e.g., resource types 610-630).

In another example, interface module 106 may present only resource types associated with backup sets managed by a data-restoration system in order to provide a clearer path to restoring data. For example, interface module 106 may determine which resource types to display to the user by (1) identifying backup sets in backup sets 130 and (2) presenting, to the user via graphical user interface 140, only resource types associated with these backup sets.

Additionally and/or alternatively, interface module 106 may present only resource types associated with backup sets created from a specific server or resource. For example, after receiving a request from a user to restore data to server 206, interface module 106 may (1) identify at least one backup set from backup sets 130 that was created from resources 212, 214, 216, or 218 and (2) present, to the user via graphical user interface 140, only resource types associated with these backup sets.

In one example, resource 212, resource 214, resource 216, and resource 218 on server 206 in FIG. 2 may represent a data storage device, a SharePoint service, an Exchange service, and an Enterprise Vault database. In this example, interface module 106 may present to a user that has requested to restore data to server 206 graphical user interface 140 (as illustrated by exemplary graphical user interface 400 in FIG. 4) that presents only resource types associated with backup sets created from the resources on server 206.

In certain examples, interface module 106 may further display to the user via graphical user interface 140 a question that prompts the user to select one of the displayed resource types that the user desires to restore. For example, as illustrated in FIG. 4, interface module 106 may display prompt 470 (e.g., the question "What do you want to restore?") to the user via graphical user interface 140 to prompt the user to select one of displayed resource types 410-416.

In order to keep track of which resource types are associated with which backup sets, in at least one example, one or more of the systems described herein may maintain resource types 122 by (1) monitoring the creation of backup sets from servers in servers 126 and/or resources in resources 128 and (2) associating newly created backup sets with the resource types associated with these servers and/or resources.

At step 306, one or more of the systems described herein may receive, from the user via the graphical user interface, a selection that identifies a resource type that the user desires to restore. For example, at step 306 type-selection module 108 may, as part of computing device 202 in FIG. 2, receive, from the user of computing device 202 via graphical user interface 140, a selection that identifies a resource type associated with data that the user desires to restore to server 206.

The systems described herein may perform step 306 in any suitable manner. For example, type-selection module 108 may enable a user to interact with graphical user interface 140 to select a resource type that the user desires to restore from the plurality of resource types that were presented to the user via graphical user interface 140 as part of step 304. As illustrated by exemplary graphical user interface 500 in FIG. 5, in one example, type-selection module 108 may enable the user to make selection 510 of resource type 410 that the user desires to restore by clicking on a graphical representation of resource type 410 displayed to the user via graphical user interface 140.

At step 308, one or more of the systems described herein may present, to the user via the graphical user interface, at least one backup set associated with the identified resource type from which the user may restore data. For example, at step 308 backup-set-presentation module 110 may, as part of computing device 202 in FIG. 2, present, to the user of computing device 202 via graphical user interface 140, at least one backup set from backup sets 130 associated with the resource type identified as part of step 306 from which the user may restore data to server 206.

As used herein, the term "backup set" may refer to a related set of data backed up from one or more resources by a single backup operation. For example, a backup set of a storage device may include a point in time representation of files and/or folders stored on the storage device when the storage device was backed up. Backup sets may be associated with one or more resource types or resource sub-types based on the resource from which the backup set was created.

The systems described herein may perform step 308 in any suitable manner. In one example, backup-set-presentation module 110 may present to the user via graphical user interface a graphical representation of any backup set within backup sets 130 that is associated with the resource type identified as part of step 306 and/or the server or resource identified as part of step 302. For example, as illustrated by exemplary graphical user interfaces 900, 1000, 1100, and 1200 in FIGS. 9-12, backup-set-presentation module 110 may present to the user via graphical user interface 140 backup sets 930-938.

Additionally and/or alternatively, backup-set-presentation module 110 may present the backup sets associated with the identified resource type as being associated with a server from which the backup set was created and/or a resource from which the backup set was created. For example, as illustrated by exemplary graphical user interfaces 900, 1000, 1100, and 1200 in FIGS. 9-12, backup-set-presentation module 110 may present to the user via graphical user interface 140 backup sets 930-938 as being associated with resource 920 and server 910.

In some examples, prior to presenting backup sets to the user, backup-set-presentation module 110 may present, to the user via graphical user interface 140, a plurality of resource sub-types that are associated with the resource type received from the user at step 306 in order to further guide the user in selecting a backup set to restore (e.g., by reducing the number of backup sets presented to the user). For example, backup-set-presentation module 110 may (1) present, to the user via graphical user interface 140, a plurality of resource sub-types that are associated with the identified resource type and that can be restored by the user, (2) receive, from the user via graphical user interface 140, a selection that identifies a resource sub-type that the user desires to restore, and (3) present, to the user via graphical user interface 140, at least one backup set associated with the identified resource sub-type from which the user may restore data.

As used herein, the term "resource sub-type" may refer to any subordinate type, characteristic, class, category, or collection of resources that may be used to enable a user to identify data that has been backed up from an associated resource and/or any term or phrase used to describe these subordinate types, characteristics, classes, categories, or collections. A resource sub-type may represent a user's likely answer to the question "What do you want to restore?" For example, as illustrated by resource sub-types 710 and 712 in FIG. 7, resource sub-types associated with the resource type "Files and Folders" (e.g., resource type 410 in FIG. 4) may include "Files and Folders from Backup", "Files and Folders from Archive", and/or "Files and Folders located via Search".

As further illustration, resource sub-types associated with the resource type "Complete System and System Components" may include "Complete System Recovery", "Active Directory, ADAM/AD LDS and System State", "Utility Partitions", and/or "EFI Partitions"; resource sub-types associated with the resource type "Shadow Copy Components" may include "PDDE Data", "DFSR Data", and "OSISoft PI Server Data"; resource sub-types associated with the resource type "Novell OES Components" may include "GroupWise Data", "iFolder Data", and "eDirectory Data"; resource sub-types associated with the resource type "Enterprise Vault Sites and Databases" may include "Enterprise Vault Site Components", "Audit, Directory, Monitoring and FSA Reporting Databases", and "Compliance and Discovery Accelerator Databases"; resource sub-types associated with the resource type "Lotus Domino Data" may include "Mail and Other Databases", "Server, ID File and Archived Transaction Logs", "Domino Attachment and Object Service Files", and "Domino Files Located via Search"; resource sub-types associated with the resource type "Oracle Data" may include "Oracle Databases" and "Oracle Tablespaces and Datafiles"; resource sub-types associated with the resource type "SQL Databases" may include "SQL Server Databases"; resource sub-types associated with the resource type "SharePoint Data" may include "SharePoint Documents, Images, Sites, Subsites, Lists, and List Items", "SharePoint Web Applications and Portal Sites", "SharePoint Configuration Database, Shared Services, Service Applications and Other Components", and "SharePoint Documents, Images, Sites, Subsites, Lists, and List Items Located via Search"; resource sub-types associated with the resource type "Exchange Data" may include "Exchange Databases", "Exchange Mailbox Items", "Mailboxes or Messages from Archive", and "Exchange Mailbox Items Located through Search"; and resource sub-types associated with the resource type "VMware and Hyper-V Data" may include "VMware Virtual Machines and Disks" and/or "Hyper-V Virtual Machines and Disks".

Returning to FIG. 3, at step 310, one or more of the systems described herein may receive, from the user via the graphical user interface, a selection that identifies a backup set that the user desires to restore. For example, at step 310 backup-set-selection module 112 may, as part of computing device 202 in FIG. 2, receive, from the user of computing device 202 via graphical user interface 140, a selection that identifies a backup set that the user desires to restore to server 206.

The systems described herein may perform step 310 in any suitable manner. In one example, backup-set-selection module 112 may enable a user to interact with graphical user interface 140 to select a backup set and/or data from the backup set that the user desires to restore from the plurality of backup sets that were presented to the user via graphical user interface 140 as part of step 308. An example of backup-set-selection module 112 enabling a user to interact with graphical user interface 140 to select a backup set and/or data that the user desires to restore will be provided below in connection with the discussion of exemplary graphical user interfaces 1000, 1100, and 1200 in FIGS. 10-12.

At step 312, one or more of the systems described herein may restore data from the identified backup set. For example, at step 312 data-restoring module 114 may, as part of computing device 202 in FIG. 2, restore data from the backup set identified as part of step 310 to server 206.

The systems described herein may perform step 312 in any suitable manner. For example, data-restoring module 114 may restore the data from the identified backup set by copying data from the backup set to a location (e.g., a server or resource) from which the data was backed up or to any other alternative location. For example, data-restoring module 114 may restore data 222 in FIG. 2 to resource 212 and/or server 206 from a backup set stored in backup sets 130 that contains a backup of data 222. Upon completion of step 312, exemplary method 300 in FIG. 3 may terminate.

FIGS. 4-12 illustrate how one or more of the systems described herein may simplify data restoration by providing a graphical user interface to a user that allows the user to select and restore data based on resource types and resource sub-types. The following discussion of FIGS. 4-12 provides an example of how, upon receiving a request from a user of computing device 202 in FIG. 2 to restore data to server 206, one or more of the systems described herein may enable the user to interact with graphical user interface 140 to restore a folder (data 1110 in FIG. 11) to server 206. In this example, interface module 106 may begin by providing, in response to the request from the user to restore data to server 206, graphical user interface 140 (as illustrated by exemplary graphical user interface 400 in FIG. 4) that presents to the user a plurality of resource types that can be restored by the user to server 206.

FIG. 4 is an illustration of an exemplary graphical user interface 400. Graphical user interface 400 illustrates how interface module 106 may provide graphical user interface 140 that presents to the user a plurality of resource types that can be restored by the user. In this example as shown in FIG. 4, graphical user interface 400 may present to a user resource types 410-416 (as shown, "Files and Folders", "SharePoint Data", "Exchange data", and "Enterprise Vault Sites and Databases"). Graphical user interface 400 may also present a question to the user in order to prompt the user to select a resource type that the user wishes to restore from among resource types 410-416. For example, graphical user interface 400 may display prompt 430 (as shown, "What do you want to restore?") to the user to prompt the user to make a selection (e.g., selection 510 in FIG. 5) of one of resource types 410-416.

Figure 5:
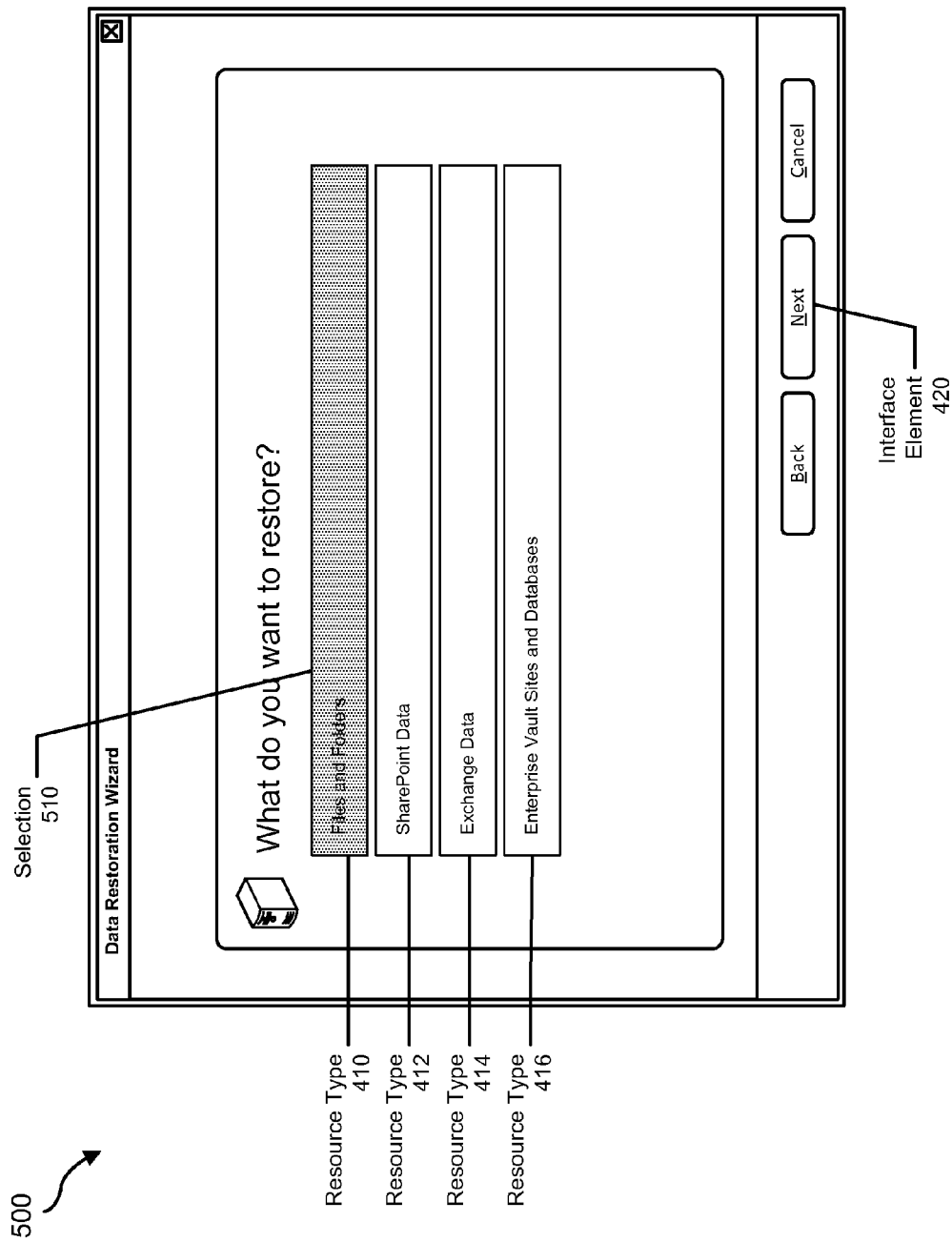
FIG. 5 is a diagram of an exemplary graphical user interface for simplifying data restoration using resource types.

FIG. 5 is an illustration of an exemplary graphical user interface 500. Graphical user interface 500 illustrates how type-selection module 108 may enable the user to interact with graphical user interface 140 (as illustrated by graphical user interface 400 in FIG. 4) to select a resource type the user desires to restore. In this example as shown in FIG. 5, the user may make selection 510 of resource type 410 by selecting (e.g., by clicking) resource type 410 to request to restore data associated with resource type 410. In this example, the user may send the selection to type-selection module 108 by interacting with (e.g., by clicking) interface element 420. In response to type-selection module 108 having received this request, backup-set-presentation module 110 may present to the user a plurality of resource sub-types associated with resource type 410 via graphical user interface 140 as illustrated by graphical user interface 700 in FIG. 7.

Figure 7:
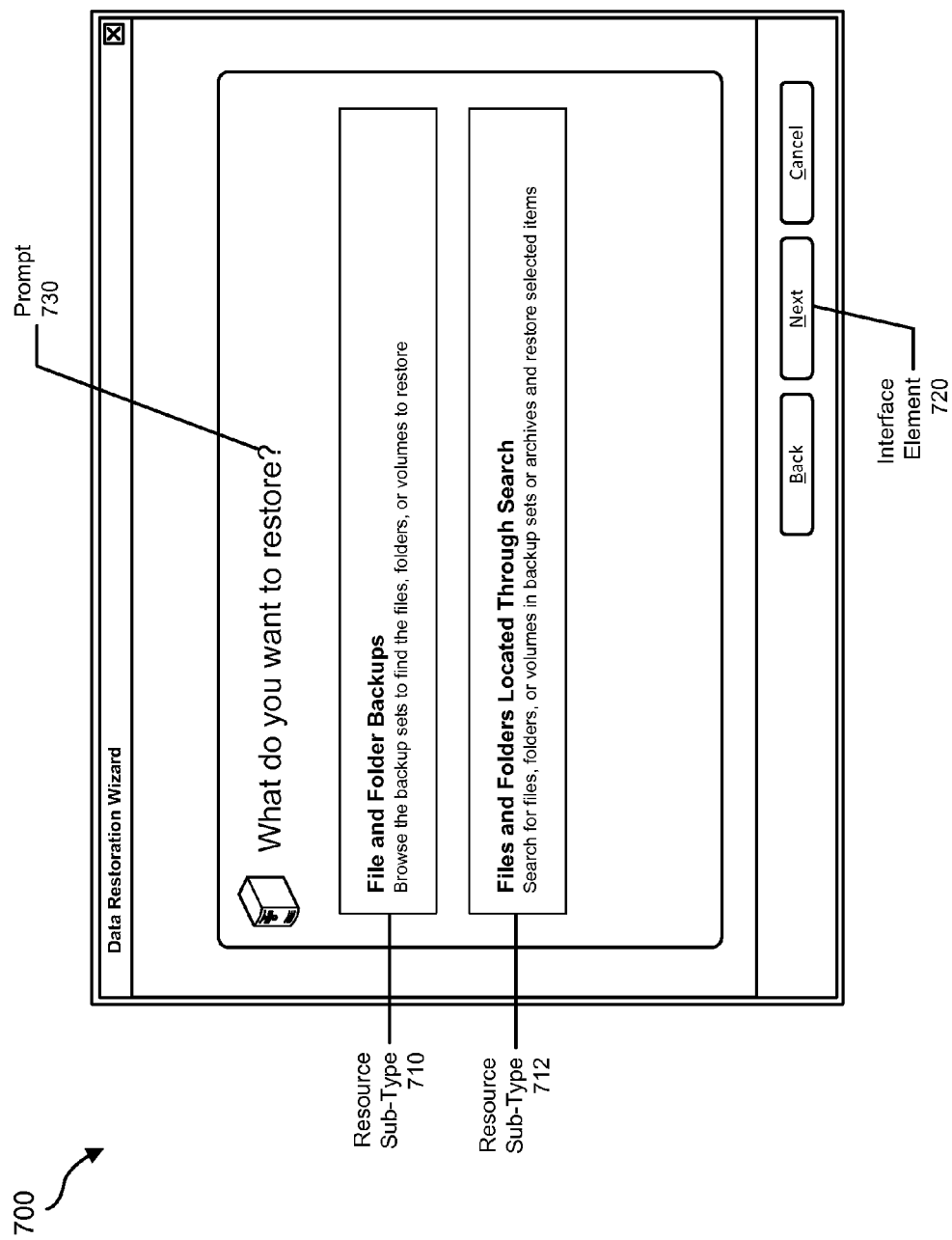
FIG. 7 is a diagram of an exemplary graphical user interface for simplifying data restoration using resource types.

FIG. 7 is an illustration of an exemplary graphical user interface 700. Graphical user interface 700 illustrates how backup-set-presentation module 110 may present to the user via graphical user interface 140 a plurality of resource sub-types that can be restored by the user. In this example as shown in FIG. 7, graphical user interface 700 may present to the user resource sub-types 710 and 712 (as shown, "File and Folder Backups" and "Files and Folders Located Through Search"). Graphical user interface 700 may also display a question to the user in order to prompt the user to select a resource sub-type that the user wishes to restore from between resource sub-types 710 and 712. For example, graphical user interface 700 may display prompt 730 (as shown, "What do you want to restore?") to the user to prompt the user to make a selection (e.g., selection 810 in FIG. 8) of one of resource sub-types 710 and 712.

Figure 8:
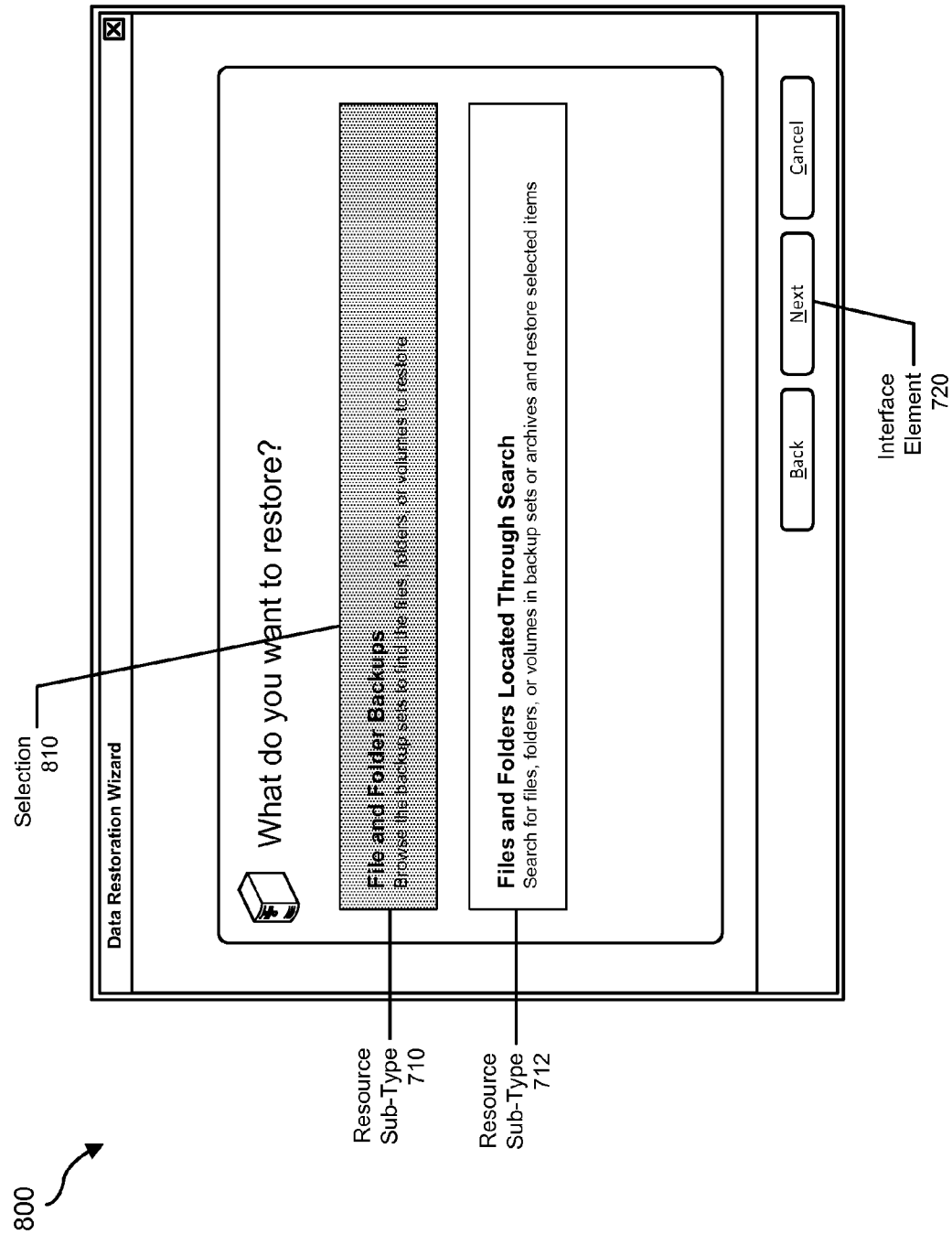
FIG. 8 is a diagram of an exemplary graphical user interface for simplifying data restoration using resource types.

FIG. 8 is an illustration of an exemplary graphical user interface 800. Graphical user interface 800 illustrates how backup-set-presentation module 110 may enable the user to interact with graphical user interface 140 (as illustrated by graphical user interface 700 in FIG. 7) to select a resource sub-type that the user desires to restore. As shown in FIG. 8, the user may make selection 810 of resource sub-type 710 by selecting (e.g., by clicking) resource sub-type 710 to request to restore data associated with resource sub-type 710. In this example, the user may send the selection to backup-set-presentation module 110 by interacting with (e.g., by clicking) interface element 720. In response to backup-set-presentation module 110 having received this request, backup-set-presentation module 110 may present to the user at least one backup set associated with resource sub-type 710 via graphical user interface 140 as illustrated by exemplary graphical user interface 900 in FIG. 9.

Figure 9:
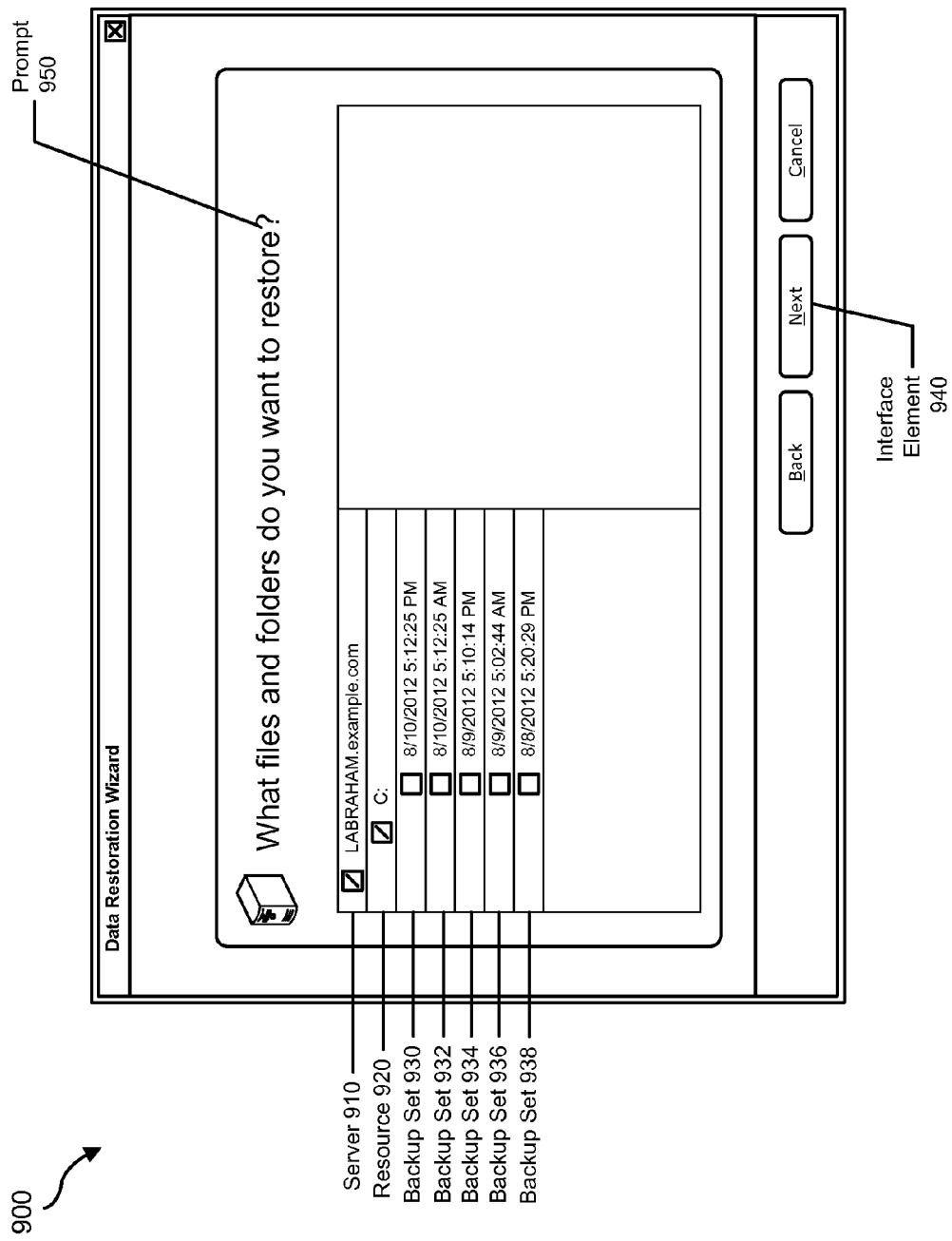
FIG. 9 is a diagram of an exemplary graphical user interface for simplifying data restoration using resource types.

FIG. 9 is an illustration of an exemplary graphical user interface 900. Graphical user interface 900 illustrates how backup-set-presentation module 110 may present to the user via graphical user interface 140 at least one backup set associated with resource sub-type 710 from which the user may restore data. In this example as shown in FIG. 9, graphical user interface 900 may present to the user backup sets 930-938. Backup-set-presentation module 110 may also present backup sets 930-938 as being associated with the server and/or the resource from which each backup set was created. For example as shown, backup-set-presentation module 110 may indicate that backup sets 930-938 were created from server 910 and resource 920.

In addition, backup-set-presentation module 110 may display a question to the user in order to prompt the user to select a backup set that the user wishes to restore from among backup sets 930-938. For example, graphical user interface 900 may display prompt 950 (as shown, "What files and folders do you want to restore?") to the user to prompt the user to make a selection (e.g., selection 1010 in FIG. 10) of one of backup sets 930-938.

Figure 10:
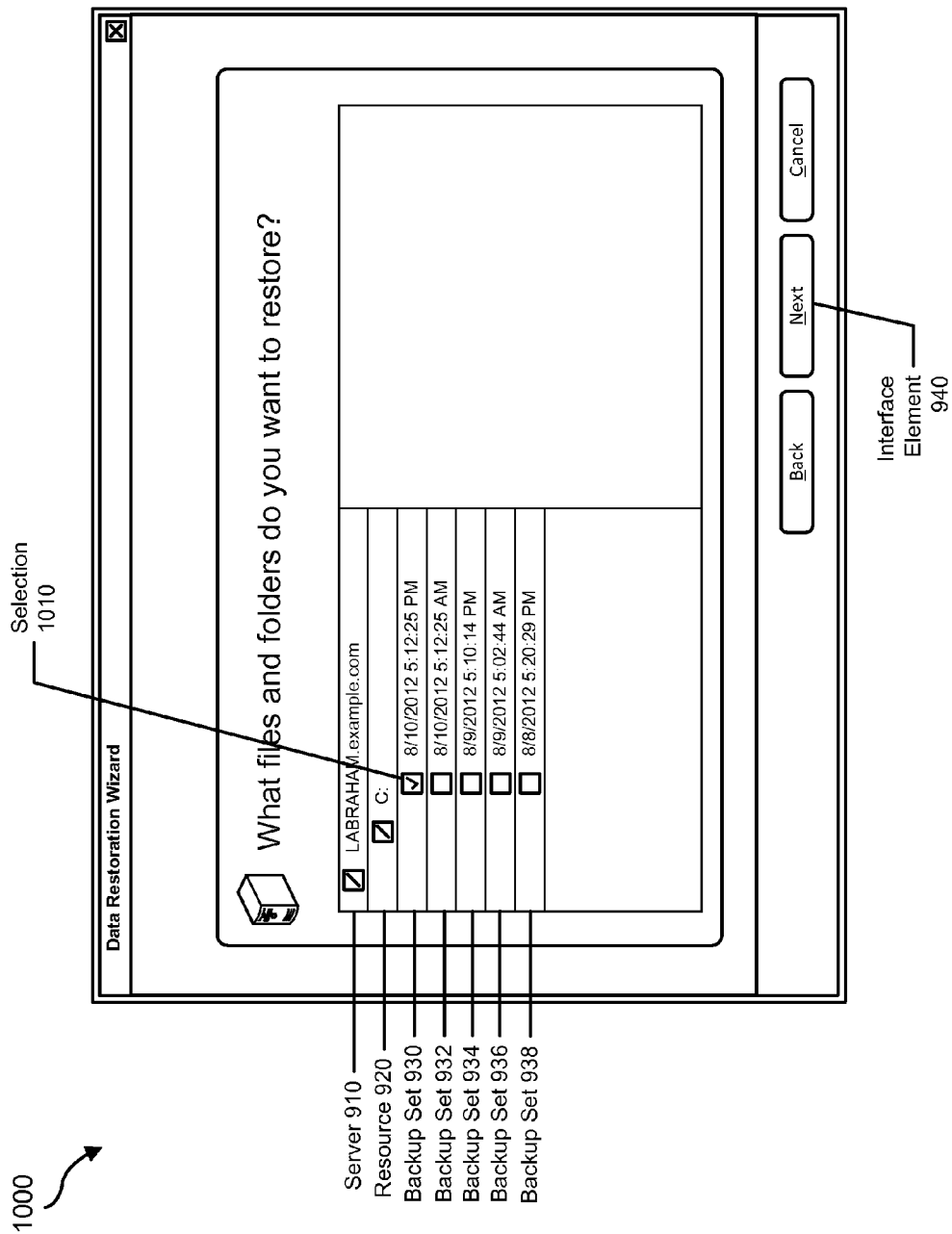
FIG. 10 is a diagram of an exemplary graphical user interface for simplifying data restoration using resource types.

FIG. 10 is an illustration of an exemplary graphical user interface 1000. Graphical user interface 1000 illustrates how backup-set-selection module 112 may enable the user to interact with graphical user interface 140 (as illustrated by graphical user interface 900 in FIG. 9) to select a backup set that the user desires to restore. In this example as shown in FIG. 10, the user may make selection 1010 of backup set 930 by selecting (e.g., by checking the checkbox associated with backup set 930) backup set 930 to request to restore data from backup set 930. In this example, the user may send the selection to backup-set-selection module 112 by interacting with (e.g., by clicking) interface element 940). In response to backup-set-selection module 112 having received this request, backup-set-selection module 120 may present to the user via graphical user interface 140 (as illustrated by graphical user interface 1100 in FIG. 11) data from backup set 930 that the user may select to restore.

Figure 11:
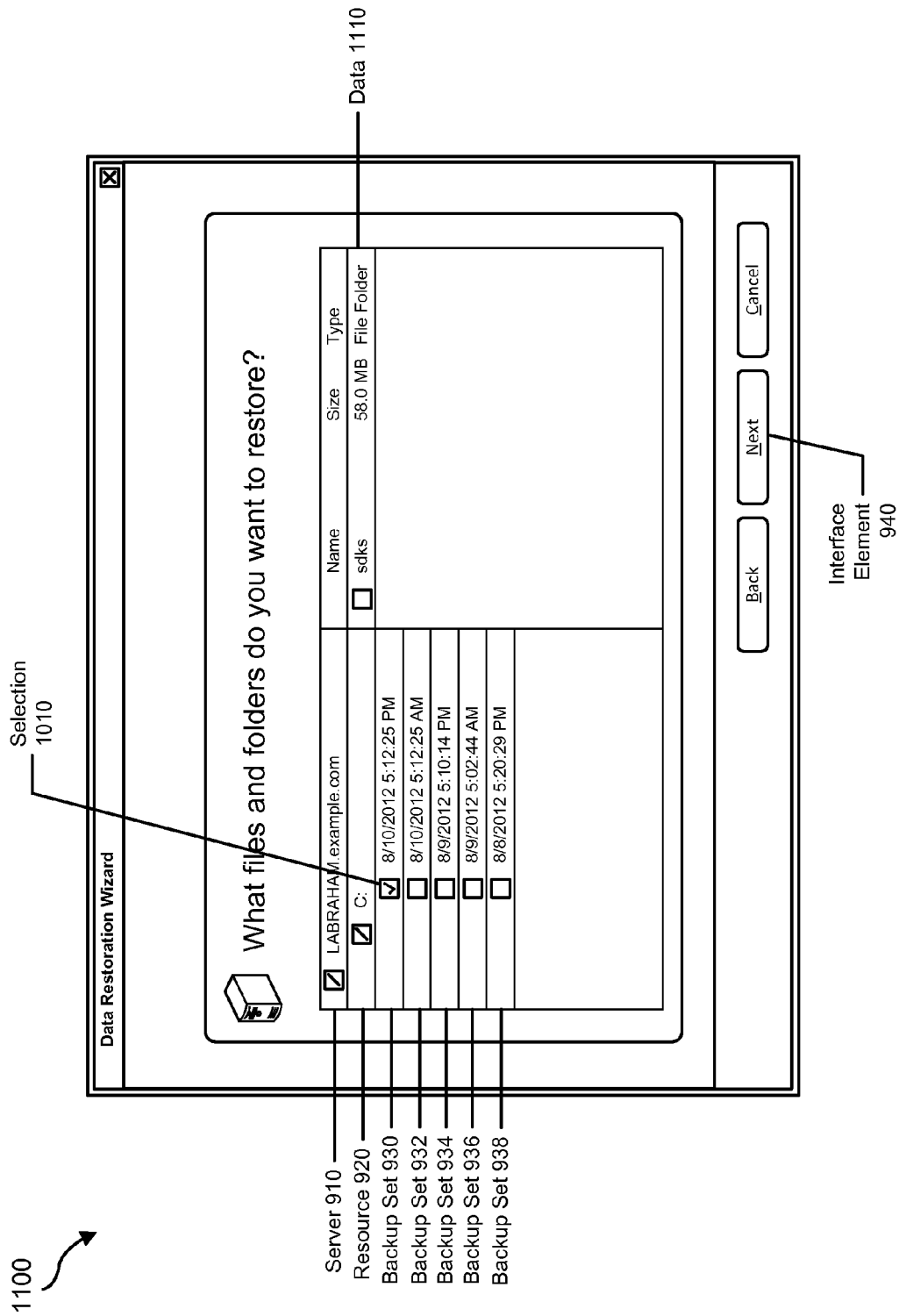
FIG. 11 is a diagram of an exemplary graphical user interface for simplifying data restoration using resource types.

FIG. 11 is an illustration of an exemplary graphical user interface 1100. Graphical user interface 1100 illustrates how backup-set-presentation module 110 may present to the user data from a backup set that the user can select to be restored. In this example as shown in FIG. 11, graphical user interface 1100 may present to the user data 1110 (as shown, a file named "sdks") from backup set 930 that the user can select (e.g., selection 1210 in FIG. 12) to be restored.

Figure 12:
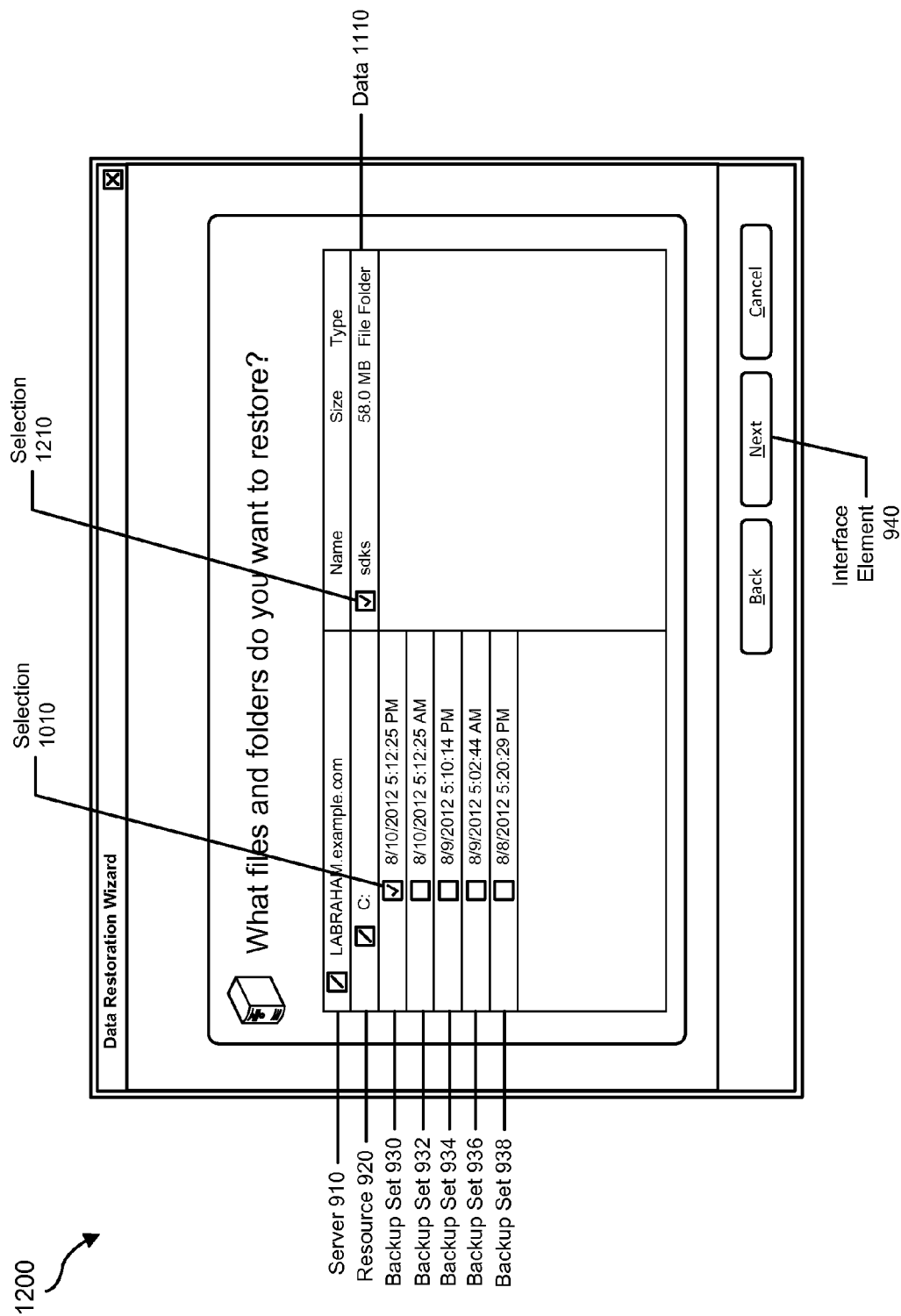
FIG. 12 is a diagram of an exemplary graphical user interface for simplifying data restoration using resource types.

FIG. 12 is an illustration of an exemplary graphical user interface 1200. Graphical user interface 1200 illustrates how backup-set-selection module 112 may enable the user to interact with graphical user interface 140 (as illustrated by graphical user interface 1100 in FIG. 11) to select data from a backup set that the user desires to restore. In this example as shown in FIG. 12, the user may make a selection (e.g., selection 1210) of data 1110 by selecting (e.g., by checking the checkbox associated with data 1110) data 1110 to request to restore data 1110 to server 206. In this example, the user may send the selection to backup-set-selection module 112 by interacting with (e.g., by clicking) interface element 940). In response to backup-set-selection module 112 having received this request, data-restoring module 114 may restore data 1110 to server 206.

As explained above, by using resource types and/or resource sub-types to guide a user to select data that the user desires to restore, the systems and methods described herein may provide the user with a clear and simple procedure to restore data. Furthermore, in some examples, by presenting to the user only resource types and/or resource sub-types associated with data that has been backed up and that is available to be restored, these systems and methods may reduce the amount of information with which the user must interact while restoring data thus eliminating user confusion caused when the user is required to interact with too much information.

Figure 13:
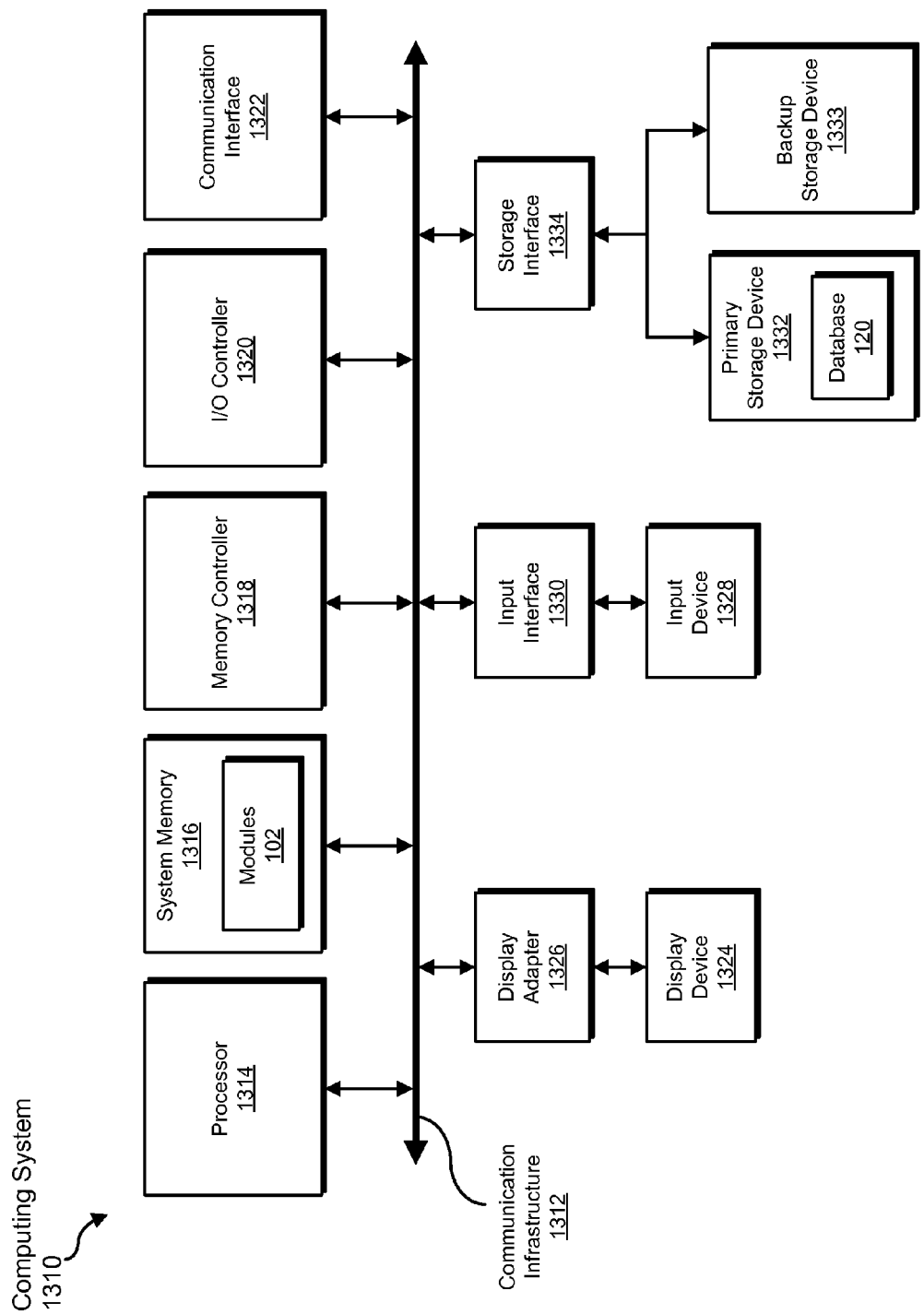
FIG. 13 is a block diagram of an exemplary computing system capable of implementing one or more of the embodiments described and/or illustrated herein.

FIG. 13 is a block diagram of an exemplary computing system 1310 capable of implementing one or more of the embodiments described and/or illustrated herein. For example, all or a portion of computing system 1310 may perform and/or be a means for performing, either alone or in combination with other elements, one or more of the receiving, providing, presenting, restoring, identifying, using, and simplifying steps described herein. All or a portion of computing system 1310 may also perform and/or be a means for performing any other steps, methods, or processes described and/or illustrated herein.

Computing system 1310 broadly represents any single or multi-processor computing device or system capable of executing computer-readable instructions. Examples of computing system 1310 include, without limitation, workstations, laptops, client-side terminals, servers, distributed computing systems, handheld devices, or any other computing system or device. In its most basic configuration, computing system 1310 may include at least one processor 1314 and a system memory 1316.

Processor 1314 generally represents any type or form of processing unit capable of processing data or interpreting and executing instructions. In certain embodiments, processor 1314 may receive instructions from a software application or module. These instructions may cause processor 1314 to perform the functions of one or more of the exemplary embodiments described and/or illustrated herein.

System memory 1316 generally represents any type or form of volatile or non-volatile storage device or medium capable of storing data and/or other computer-readable instructions. Examples of system memory 1316 include, without limitation, Random Access Memory (RAM), Read Only Memory (ROM), flash memory, or any other suitable memory device. Although not required, in certain embodiments computing system 1310 may include both a volatile memory unit (such as, for example, system memory 1316) and a non-volatile storage device (such as, for example, primary storage device 1332, as described in detail below). In one example, one or more of modules 102 from FIG. 1 may be loaded into system memory 1316.

In certain embodiments, exemplary computing system 1310 may also include one or more components or elements in addition to processor 1314 and system memory 1316. For example, as illustrated in FIG. 13, computing system 1310 may include a memory controller 1318, an Input/Output (I/O) controller 1320, and a communication interface 1322, each of which may be interconnected via a communication infrastructure 1312. Communication infrastructure 1312 generally represents any type or form of infrastructure capable of facilitating communication between one or more components of a computing device. Examples of communication infrastructure 1312 include, without limitation, a communication bus (such as an Industry Standard Architecture (ISA), Peripheral Component Interconnect (PCI), PCI Express (PCIe), or similar bus) and a network.

Memory controller 1318 generally represents any type or form of device capable of handling memory or data or controlling communication between one or more components of computing system 1310. For example, in certain embodiments memory controller 1318 may control communication between processor 1314, system memory 1316, and I/O controller 1320 via communication infrastructure 1312.

I/O controller 1320 generally represents any type or form of module capable of coordinating and/or controlling the input and output functions of a computing device. For example, in certain embodiments I/O controller 1320 may control or facilitate transfer of data between one or more elements of computing system 1310, such as processor 1314, system memory 1316, communication interface 1322, display adapter 1326, input interface 1330, and storage interface 1334.

Communication interface 1322 broadly represents any type or form of communication device or adapter capable of facilitating communication between exemplary computing system 1310 and one or more additional devices. For example, in certain embodiments communication interface 1322 may facilitate communication between computing system 1310 and a private or public network including additional computing systems. Examples of communication interface 1322 include, without limitation, a wired network interface (such as a network interface card), a wireless network interface (such as a wireless network interface card), a modem, and any other suitable interface. In at least one embodiment, communication interface 1322 may provide a direct connection to a remote server via a direct link to a network, such as the Internet. Communication interface 1322 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1322 may also represent a host adapter configured to facilitate communication between computing system 1310 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1322 may also allow computing system 1310 to engage in distributed or remote computing. For example, communication interface 1322 may receive instructions from a remote device or send instructions to a remote device for execution.

As illustrated in FIG. 13, computing system 1310 may also include at least one display device 1324 coupled to communication infrastructure 1312 via a display adapter 1326. Display device 1324 generally represents any type or form of device capable of visually displaying information forwarded by display adapter 1326. Similarly, display adapter 1326 generally represents any type or form of device configured to forward graphics, text, and other data from communication infrastructure 1312 (or from a frame buffer, as known in the art) for display on display device 1324.

As illustrated in FIG. 13, exemplary computing system 1310 may also include at least one input device 1328 coupled to communication infrastructure 1312 via an input interface 1330. Input device 1328 generally represents any type or form of input device capable of providing input, either computer or human generated, to exemplary computing system 1310. Examples of input device 1328 include, without limitation, a keyboard, a pointing device, a speech recognition device, or any other input device.

As illustrated in FIG. 13, exemplary computing system 1310 may also include a primary storage device 1332 and a backup storage device 1333 coupled to communication infrastructure 1312 via a storage interface 1334. Storage devices 1332 and 1333 generally represent any type or form of storage device or medium capable of storing data and/or other computer-readable instructions. For example, storage devices 1332 and 1333 may be a magnetic disk drive (e.g., a so-called hard drive), a solid state drive, a floppy disk drive, a magnetic tape drive, an optical disk drive, a flash drive, or the like. Storage interface 1334 generally represents any type or form of interface or device for transferring data between storage devices 1332 and 1333 and other components of computing system 1310. In one example, database 120 from FIG. 1 may be stored in primary storage device 1332.

In certain embodiments, storage devices 1332 and 1333 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1332 and 1333 may also include other similar structures or devices for allowing computer software, data, or other computer-readable instructions to be loaded into computing system 1310. For example, storage devices 1332 and 1333 may be configured to read and write software, data, or other computer-readable information. Storage devices 1332 and 1333 may also be a part of computing system 1310 or may be a separate device accessed through other interface systems.

Many other devices or subsystems may be connected to computing system 1310. Conversely, all of the components and devices illustrated in FIG. 13 need not be present to practice the embodiments described and/or illustrated herein. The devices and subsystems referenced above may also be interconnected in different ways from that shown in FIG. 13. Computing system 1310 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 1310. All or a portion of the computer program stored on the computer-readable-storage medium may then be stored in system memory 1316 and/or various portions of storage devices 1332 and 1333. When executed by processor 1314, a computer program loaded into computing system 1310 may cause processor 1314 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1310 may be configured as an Application Specific Integrated Circuit (ASIC) adapted to implement one or more of the exemplary embodiments disclosed herein.

FIG. 14 is a block diagram of an exemplary network architecture 1400 in which client systems 1410, 1420, and 1430 and servers 1440 and 1445 may be coupled to a network 1450. As detailed above, all or a portion of network architecture 1400 may perform and/or be a means for performing, either alone or in combination with other elements, one or more of the receiving, providing, presenting, restoring, identifying, using, and simplifying steps disclosed herein. All or a portion of network architecture 1400 may also be used to perform and/or be a means for performing other steps and features set forth in the instant disclosure.

Client systems 1410, 1420, and 1430 generally represent any type or form of computing device or system, such as exemplary computing system 1310 in FIG. 13. Similarly, servers 1440 and 1445 generally represent computing devices or systems, such as application servers or database servers, configured to provide various database services and/or run certain software applications. Network 1450 generally represents any telecommunication or computer network including, for example, an intranet, a WAN, a LAN, a PAN, or the Internet. In one example, client systems 1410, 1420, and/or 1430 and/or servers 1440 and/or 1445 may include all or a portion of system 100 from FIG. 1.

As illustrated in FIG. 14, one or more storage devices 1460(1)-(N) may be directly attached to server 1440. Similarly, one or more storage devices 1470(1)-(N) may be directly attached to server 1445. Storage devices 1460(1)-(N) and storage devices 1470(1)-(N) generally represent any type or form of storage device or medium capable of storing data and/or other computer-readable instructions. In certain embodiments, storage devices 1460(1)-(N) and storage devices 1470(1)-(N) may represent Network-Attached Storage (NAS) devices configured to communicate with servers 1440 and 1445 using various protocols, such as Network File System (NFS), Server Message Block (SMB), or Common Internet File System (CIFS).

Servers 1440 and 1445 may also be connected to a Storage Area Network (SAN) fabric 1480. SAN fabric 1480 generally represents any type or form of computer network or architecture capable of facilitating communication between a plurality of storage devices. SAN fabric 1480 may facilitate communication between servers 1440 and 1445 and a plurality of storage devices 1490(1)-(N) and/or an intelligent storage array 1495. SAN fabric 1480 may also facilitate, via network 1450 and servers 1440 and 1445, communication between client systems 1410, 1420, and 1430 and storage devices 1490(1)-(N) and/or intelligent storage array 1495 in such a manner that devices 1490(1)-(N) and array 1495 appear as locally attached devices to client systems 1410, 1420, and 1430. As with storage devices 1460(1)-(N) and storage devices 1470(1)-(N), storage devices 1490(1)-(N) and intelligent storage array 1495 generally represent any type or form of storage device or medium capable of storing data and/or other computer-readable instructions.

In certain embodiments, and with reference to exemplary computing system 1310 of FIG. 13, a communication interface, such as communication interface 1322 in FIG. 13, may be used to provide connectivity between each client system 1410, 1420, and 1430 and network 1450. Client systems 1410, 1420, and 1430 may be able to access information on server 1440 or 1445 using, for example, a web browser or other client software. Such software may allow client systems 1410, 1420, and 1430 to access data hosted by server 1440, server 1445, storage devices 1460(1)-(N), storage devices 1470(1)-(N), storage devices 1490(1)-(N), or intelligent storage array 1495. Although FIG. 14 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1440, server 1445, storage devices 1460(1)-(N), storage devices 1470(1)-(N), storage devices 1490(1)-(N), intelligent storage array 1495, or any combination thereof. All or a portion of one or more of the exemplary embodiments disclosed herein may also be encoded as a computer program, stored in server 1440, run by server 1445, and distributed to client systems 1410, 1420, and 1430 over network 1450.

As detailed above, computing system 1310 and/or one or more components of network architecture 1400 may perform and/or be a means for performing, either alone or in combination with other elements, one or more steps of an exemplary method for simplifying data restoration using resource types.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may (1) receive a request from a user to restore data to a server and a set of resource types associated with data that may be restored to the server, (2) use the request from the user and the set of resource types to generate and then present to the user a graphical user interface that enables the user to select a resource type that the user desires to restore to the server, (3) use a resource type selected by the user via the graphical user interface to generate and then present to the user a second graphical user interface that enables the user to select a backup set from which the user may restore data to the server, and (4) use a backup set selected by the user via the second graphical user interface to restore data to the server. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for simplifying data restoration using resource types, at least a portion of the method being performed by a computing device comprising at least one processor, the method comprising:
   receiving a request from a user to perform a data restoration operation that is capable of restoring data from at least one of a plurality of backup sets, wherein each of the plurality of backup sets:
      contains data that was backed up from at least one of a plurality of data resources during a backup operation; and
      is associated with a resource type of each data resource from which the backup set was generated;
   providing, in response to the request to perform the data restoration operation, a graphical user interface that presents to the user a plurality of resource types associated with the plurality of backup sets;
   receiving, from the user via the graphical user interface, a selection that identifies a resource type;
   presenting, to the user via the graphical user interface, at least one of the plurality of backup sets associated with the identified resource type;
   receiving, from the user via the graphical user interface, a selection that identifies one of the plurality of backup sets presented to the user;
   restoring data from the identified backup set.

2. The method of claim 1, wherein:
   the plurality of backup sets are managed by a data-restoration system;
   providing the graphical user interface comprises
   presenting, to the user via the graphical user interface, only resource types associated with the plurality of backup sets managed by the data-restoration system.

3. The method of claim 1, wherein:
   each of the plurality of backup sets is associated with a resource sub-type of each data resource from which the backup set was generated;
   presenting the at least one of the plurality of backup sets associated with the identified resource type comprises:
      presenting, to the user via the graphical user interface, a plurality of resource sub-types, wherein the plurality of resource sub-types are associated with the identified resource type;
      receiving, from the user via the graphical user interface, a selection that identifies a resource sub-type;
      presenting, to the user via the graphical user interface, at least one of the plurality of backup sets associated with the identified resource sub-type.

4. The method of claim 3, wherein:
   the plurality of backup sets are managed by a data-restoration system;
   presenting the plurality of resource sub-types comprises
   presenting, to the user via the graphical user interface, only resource sub-types associated with the plurality of backup sets managed by the data-restoration system.

5. The method of claim 1, wherein:
   the request from the user to perform the data restoration comprises a request to restore data to a server;
   the plurality of resource types comprises a resource type of a resource on the server.

6. The method of claim 1, wherein presenting the at least one of the plurality of backup sets associated with the identified resource type comprises presenting the at least one of the plurality of backup sets as being associated with at least one of:
   a server from which the at least one of the plurality of backup sets was created;
   a resource from which the at least one of the plurality of backup sets was created.

7. The method of claim 1, wherein the user is prompted to select the identified resource type and the identified backup set via the graphical user interface using a series of questions presented to the user via the graphical user interface.

8. A system for simplifying data restoration using resource types, the system comprising:
   a restoration module programmed to receive a request from a user to perform a data restoration operation that is capable of restoring data from at least one of a plurality of backup sets, wherein each of the plurality of backup sets:
      contains data that was backed up from at least one of a plurality of data resources during a backup operation; and
      is associated with a resource type of each data resource from which the backup set was generated;
   an interface module programmed to provide, in response to the request to perform the data restoration operation, a graphical user interface that presents to the user a plurality of resource types associated with the plurality of backup sets;
   a type-selection module programmed to receive, from the user via the graphical user interface, a selection that identifies a resource type;
   a backup-set-presentation module programmed to present, to the user via the graphical user interface, at least one of the plurality of backup sets associated with the identified resource type;
   a backup-set-selection module programmed to receive, from the user via the graphical user interface, a selection that identifies one of the plurality of backup sets presented to the user;

a data-restoring module programmed to restore data from the identified backup set;

at least one processor configured to execute the restoration module, the interface module, the type-selection module, the backup-set-presentation module, the backup-set-selection module, and the data-restoring module.

9. The system of claim 8, wherein:

the plurality of backup sets are managed by a data-restoration system;

the interface module is programmed to provide the graphical user interface by presenting, to the user via the graphical user interface, only resource types associated with the plurality of backup sets managed by the data-restoration system.

10. The system of claim 8, wherein:

each of the plurality of backup sets is associated with a resource sub-type of each data resource from which the backup set was generated;

the backup-set-presentation module is programmed to present the at least one of the plurality of backup sets associated with the identified resource type by:

presenting, to the user via the graphical user interface, a plurality of resource sub-types, wherein the plurality of resource sub-types are associated with the identified resource type;

receiving, from the user via the graphical user interface, a selection that identifies a resource sub-type;

presenting, to the user via the graphical user interface, at least one of the plurality of backup sets associated with the identified resource sub-type.

11. The system of claim 10, wherein:

the plurality of backup sets are managed by a data-restoration system;

the backup-set-presentation module is programmed to present the plurality of resource sub-types by presenting, to the user via the graphical user interface, only resource sub-types associated with the plurality of backup sets managed by the data-restoration system.

12. The system of claim 8, wherein:

the request from the user to perform the data restoration comprises a request to restore data to a server;

the plurality of resource types comprises a resource type of a resource on the server.

13. The system of claim 8, wherein the backup-set-presentation module is programmed to present the at least one of the plurality of backup sets associated with the identified resource type by presenting the at least one of the plurality of backup sets as being associated with at least one of:

a server from which the at least one of the plurality of backup sets was created;

a resource from which the at least one of the plurality of backup sets was created.

14. The system of claim 8, wherein the user is prompted to select the identified resource type and the identified backup set via the graphical user interface using a series of questions presented to the user via the graphical user interface.

15. A non-transitory computer-readable medium comprising one or more computer-executable instructions that, when executed by at least one processor of a computing device, cause the computing device to:

receive a request from a user to perform a data restoration operation that is capable of restoring data from at least one of a plurality of backup sets, wherein each of the plurality of backup sets:

contains data that was backed up from at least one of a plurality of data resources during a backup operation; and is associated with a resource type of each data resource from which the backup set was generated;

provide, in response to the request to perform the data restoration operation, a graphical user interface that presents to the user a plurality of resource types associated with the plurality of backup sets;

receive, from the user via the graphical user interface, a selection that identifies a resource type;

present, to the user via the graphical user interface, at least one of the plurality of backup sets associated with the identified resource type;

receive, from the user via the graphical user interface, a selection that identifies one of the plurality of backup sets presented to the user;

restore data from the identified backup set.

16. The non-transitory computer-readable medium of claim 15, wherein:

the plurality of backup sets are managed by a data-restoration system;

the one or more computer-executable instructions are programmed to cause the computing device to provide the graphical user interface by presenting, to the user via the graphical user interface, only resource types associated with the plurality of backup sets managed by the data-restoration system.

17. The non-transitory computer-readable medium of claim 15, wherein:

each of the plurality of backup sets is associated with a resource sub-type of each data resource from which the backup set was generated;

the one or more computer-executable instructions are programmed to cause the computing device to present the at least one of the plurality of backup sets associated with the identified resource type by:

presenting, to the user via the graphical user interface, a plurality of resource sub-types, wherein the plurality of resource sub-types are associated with the identified resource type;

receiving, from the user via the graphical user interface, a selection that identifies a resource sub-type;

presenting, to the user via the graphical user interface, at least one of the plurality of backup sets associated with the identified resource sub-type.

18. The non-transitory computer-readable medium of claim 17, wherein:

the plurality of backup sets are managed by a data-restoration system;

the one or more computer-executable instructions are programmed to cause the computing device to present the plurality of resource sub-types by presenting, to the user via the graphical user interface, only resource sub-types associated with the plurality of backup sets managed by the data-restoration system.

19. The non-transitory computer-readable medium of claim 15, wherein:

the request from the user to perform the data restoration comprises a request to restore data to a server;

the plurality of resource types comprises a resource type of a resource on the server.

20. The non-transitory computer-readable medium of claim 15, wherein the one or more computer-executable instructions are programmed to cause the computing device to present the at least one of the plurality of backup sets associated with the identified resource type comprises presenting the at least one of the plurality of backup sets as being associated with at least one of:

a server from which the at least one of the plurality of backup sets was created;

a resource from which the at least one of the plurality of backup sets was created.

* * * * *